E. M. BENEDICT.

MACHINE FOR WASHING DISHES.

APPLICATION FILED AUG. 26, 1916.

Reissued Mar. 18, 1919.

14,612.

2 SHEETS—SHEET 1.

Inventor
Ernest M. Benedict
by Allen & Allen
Attorneys

E. M. BENEDICT.

MACHINE FOR WASHING DISHES.

APPLICATION FILED AUG. 26, 1916.

Reissued Mar. 18, 1919.

14,612.

2 SHEETS—SHEET 2.

Inventor
Ernest M. Benedict
by Allen & Allen
Attorneys

UNITED STATES PATENT OFFICE.

ERNEST M. BENEDICT, OF CINCINNATI, OHIO.

MACHINE FOR WASHING DISHES.

14,612. Specification of Reissued Letters Patent. Reissued Mar. 18, 1919.

Original No. 1,176,125, dated March 21, 1916, Serial No. 815,306, filed January 29, 1914. Application for reissue filed August 26, 1916. Serial No. 117,120.

*To all whom it may concern:*

Be it known that I, ERNEST M. BENEDICT, a citizen of the United States, and a resident of the city of Cincinnati, in the county of Hamilton and State of Ohio, have invented certain new and useful Improvements in Machines for Washing Dishes, of which the following is a full, clear, and exact description, reference being had to the accompanying drawings, forming part of this specification.

My invention relates to dish washing machines in which a spray of cleaning and rinsing water is brought in contact with the dishes. In machines of this character, the simplicity of parts and the ease of operation are of great importance, and it is the object of my invention to provide a machine of this character wherein the operation thereof is accomplished by the water, said water sent at its own pressure through the machine, and accomplishing a shifting of the spraying devices so as to thoroughly cleanse the dishes.

This object and other advantages to be noted, I accomplish by that certain construction and arrangement of parts to be hereinafter more specifically pointed out and claimed.

Figure 1:
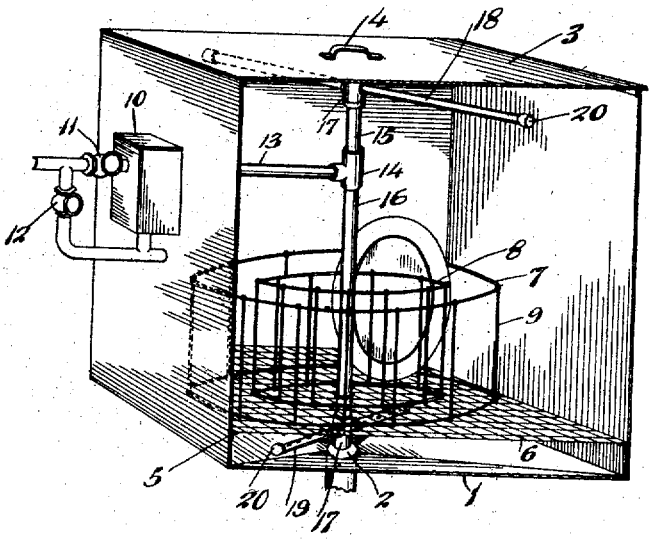
Figure 1 is a perspective view of the machine with one side opened to show the interior construction.
Figure 2:
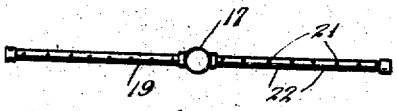
Fig. 2 is a plan view of one of the revolving pipes.
Figure 3:
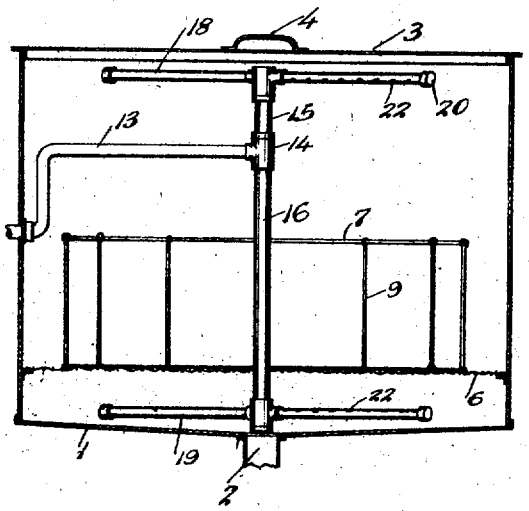
Fig. 3 is a vertical section of the machine showing the pipes in elevation.
Figure 4:
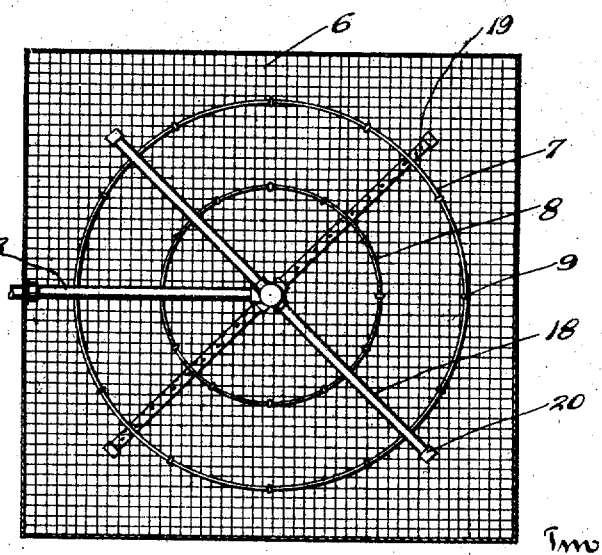
Fig. 4 is a top plan view of the machine taken with the cover removed.

1 is the base of the machine casing, which has a slope to the center, terminating in an outlet 2, which may be connected to the house drain, or directed into a sink or the like. The preferred structure of the casing portion is otherwise in the shape of a plain box, with a removable lid 3, having a handle 4. Angle brackets 5, 5, are mounted along the sides of the machine above the base, and on these brackets rests the dish supporting screen 6.

On this screen are also preferably erected the dish supportnig rings 7 and 8, which are held up by the posts 9 suitably secured to the screen (no particular means being shown).

In connection with the machine is a soaper 10 adapted to take water from the house mains and saturate it with soap. A valve 11 admits water to the soaper, and a valve 12 admits water around the soaper to the inlet pipe 13 of the machine.

The inlet pipe extends into the center of the casing and it is preferably located above the middle point thereof. It is provided with a T 14, into which are fixedly mounted the vertically alined pipes 15 and 16. These pipes might be in the shape of one pipe with a hole bored in it (not shown), but this need not be described, as it is purely an equivalent structure. It is to be noted that the method is immaterial by which the connection is made between the inlet pipe 13 and the pipe or pipes 15 and 16. The inlet pipe might be brought in at the bottom of the casing and connected to the pipes 15 and 16, or in any other manner.

The pipes which extend with one above and one below the screen 6, are provided at their outer ends with revoluble couplings 17, 17, in which are suitably secured the desired number of horizontal pipes 18 and 19. The pipes are positioned so as to extend each way from the revoluble couplings to approximately the sides of the casing, and are provided with caps 20, 20, for closing their ends. The only essential feature of the water connections is that they shall be capable of mounting the revoluble couplings now identified and supplying the pipes that extend therefrom with water, so that the pipes may be used as sprayers and revolve on vertical axes in approximate alinement.

Each pipe has two sets of perforations, one set 21 which is directed toward the screen or dish rack 6, and the other set 22 at an angle thereto. The result of this will be that the water flowing out of the pipes will partially be projected directly against the dishes on the rack and the balance projected against them at an angle so as to cause the revolubly mounted pipes to revolve. This revolution will cause the water to thoroughly wash the dishes at all points and at the same time will not seriously use up the water pressure or waste the water employed to impart the rotary motion to the pipes. The arrangement of jets, so that rotation will be given to the pipes, can be varied in many ways without directing any water so that it does not strike the dishes.

The operation of the machine is simple, and the various parts inexpensive and of easy replacement. First soapy water is sent through the pipes and then clean water for rinsing. The dishes may then be allowed to dry without removing them, as they are on the rack 6 which acts as a drain board.

It is recognized that to arrange nozzles above and below a dish rack is not new in the art, but it should be noted that these nozzles of the past have been adapted to throw a large amount of water from a few points which will not reach all of the dishes, and which is in addition a great waste of water resulting in the necessity of using a force pump with the machine. In the first place, a washer should have a number of sprays in several directions so as to direct water from a multitude of points at the dishes, and in the next place it should at the same time economize in water. I accomplish these features by my sprayer pipes which extend practically to the sides of the casing and have small perforations spaced along their surface, in opposed relation to each other. The pipes are small in diameter, as may be seen by comparing their size with the plate in the rack in Fig. 1. Thus the amount of water is strictly economized by sending it only through perforations, and the pipes are light and easy to revolve so that great force is not necessary to operate them. In my water distribution and my simple and automatic operation throughout, capable of operation from ordinary domestic water supply, lies the secret of my invention, as I do not believe that prior to my invention there have been any dish washers capable of doing efficient work from domestic supply pipes in an economic way.

I thus accomplish a complete washing of dishes with the minimum of expense and with the greatest possible simplicity. There are enough movable jets so that there is no such defect in my machine as is evident in the prior art, where the source of the movable jets is merely in one or two points. The fact that my jet bearing pipes are in opposed relation to each other provides a dashing of water in every direction so that practically all kinds of dishes may be washed, and in addition to this I do not have the large number of stationary jets found in the art, but conserve my water and direct it in a manner to do the best work with the least water supply.

These features enable me to do without a force pump which is almost universally used in the machines of the past, since I do not require very speedy rotation to accomplish a full cleaning and the distribution of jets enables me to get a full swing of the pipes without much waste water. Furthermore I do not need to couple my revolving elements above and below the dish rack together to get sufficient rotation.

The exact means of mounting the pipes and the exact positioning of jets are not insisted upon or considered essentials of my invention.

Having thus described my invention, what I claim as new and desire to secure by Letters Patent, is:—

1. In a dish washing machine, the combination of a casing and a suitable support therein for the articles to be washed, a pair of vertically alined pipes and means for supplying water under pressure thereto, one of said pipes extending above and the other below the support, a revoluble coupling for the outer end of each of said pipes, with vertical axes therefor, said couplings provided with laterally extending arms closed at the ends, with a double series of perforations along each arm, with the openings of one series directed toward the support and of the other series at an angle thereto, whereby a direct discharge of water toward the supports may be obtained simultaneously with the rotation of the arms by the discharge of water from the angularly disposed openings.

2. In a dish washing machine adapted to run on ordinary domestic water pressure, comprising an inclosed casing and a suitable support for dishes mounted therein, revoluble couplings, means for mounting them, one above and one below the support so as to revolve on vertical axes, means for supplying water thereto, and pipes extending from said couplings approximately to the sides of the casing, and provided with perforations of small size distributed along them, said perforations being so directed that the water flowing therefrom will strike against the dish support and simultaneously cause the pipes to revolve with the couplings, said casing having an opening of a size to permit the continuous escape of water discharged by the pipes.

3. In a dish washing machine adapted to run on ordinary domestic water pressure, comprising an inclosed casing, and a suitable support for dishes mounted therein, water supplying devices comprising pipes radiating from the center and extending to the sides of the casing above and below the support, means for rotatably mounting the same, and means for connecting same to a source of supply of water, said pipes having a limited number of outlets therein so as to use the minimum amount of water required to cleanse the dishes, said outlets being directioned so as to spray water toward the dishes and simultaneously impart rotation to said pipes, said casing having an opening of a size to permit the continuous escape of water discharged by the pipes.

ERNEST M. BENEDICT.